May 30, 1961

W. E. WERTS 2,986,126

CONTROL APPARATUS

Filed Oct. 24, 1957

INVENTOR.
WAYNE E. WERTS.
BY
ATTORNEY.

Fig. 2.

INVENTOR.
WAYNE E. WERTS.
BY Cecil F Arens
ATTORNEY.

May 30, 1961 W. E. WERTS 2,986,126
CONTROL APPARATUS
Filed Oct. 24, 1957 5 Sheets-Sheet 4

Fig.7.

INVENTOR.
WAYNE E. WERTS.
BY
ATTORNEY.

Fig. 8.

United States Patent Office 2,986,126
Patented May 30, 1961

2,986,126

CONTROL APPARATUS

Wayne E. Werts, South Bend, Ind., assignor to The Bendix Corporation, a corporation of Delaware Filed Oct. 24, 1957, Ser. No. 692,098

7 Claims. (Cl. 121—42)

This invention relates to position control mechanism for fluid regulating systems and, while not being limited to use thereto, it is particularly adapted for use in a fuel control system for an aircraft gas turbine engine.

The usual gas turbine engine is supplied fuel by fuel control apparatus which functions to meter fuel in accordance with a predetermined fuel flow schedule. To this end, the fuel control apparatus may employ a variable area metering valve, a fuel by-pass valve for controlling a constant or variable pressure differential across the metering valve, speed governing mechanism for controlling fuel flow in response to a speed signal from the engine and pressure relief valve means for limiting operating fuel pressures within the fuel control apparatus to predetermined maximum values. For precise control of fuel flow, it is desirable that the above mentioned mechanisms cooperate in such manner as to impart fast response characteristics to the overall system and, in addition, reduce instability in the system to a minimum. The governor mechanism may be of the proportional action type or the isochronous action type, each of these types having advantages and disadvantages peculiar to its design. The proportional governor is stable in operation but functions to maintain the speed of the engine constant at a selected speed only under a given set of operating variables. The isochronous governor is unstable in operation but functions to maintain the engine speed constant regardless of changes in the engine operating variables.

It is an object of this invention to provide a proportional acting governor with reset mechanism for controlling the governor to maintain the engine at a predetermined isochronous speed setting regardless of changes in the engine operating variables.

It is an object of this invention to provide reset mechanism for regulating fluid flow in accordance with a predetermined ratio of fluid pressures.

It is another object of this invention to provide fluid pressure operated reset mechanism having excellent response characteristics and which is stable in operation.

It is an object of this invention to provide a hydraulic governing mechanism.

It is another object of this invention to provide a reset mechanism which eliminates the need for speed anticipation apparatus in a speed governing control system.

It is a further object of this invention to provide simple and reliable mechanism for controlling the speed of an engine at a constant predetermined speed.

It is a still further object of this invention to provide a proportional acting speed governor with reset mechanism which may be easily adjusted to establish stable engine operation under varying conditions of operating variables.

Other objects and advantages of this invention will become apparent in view of the following description taken in conjunction with the drawings wherein.

Figures 1, 5, 6:
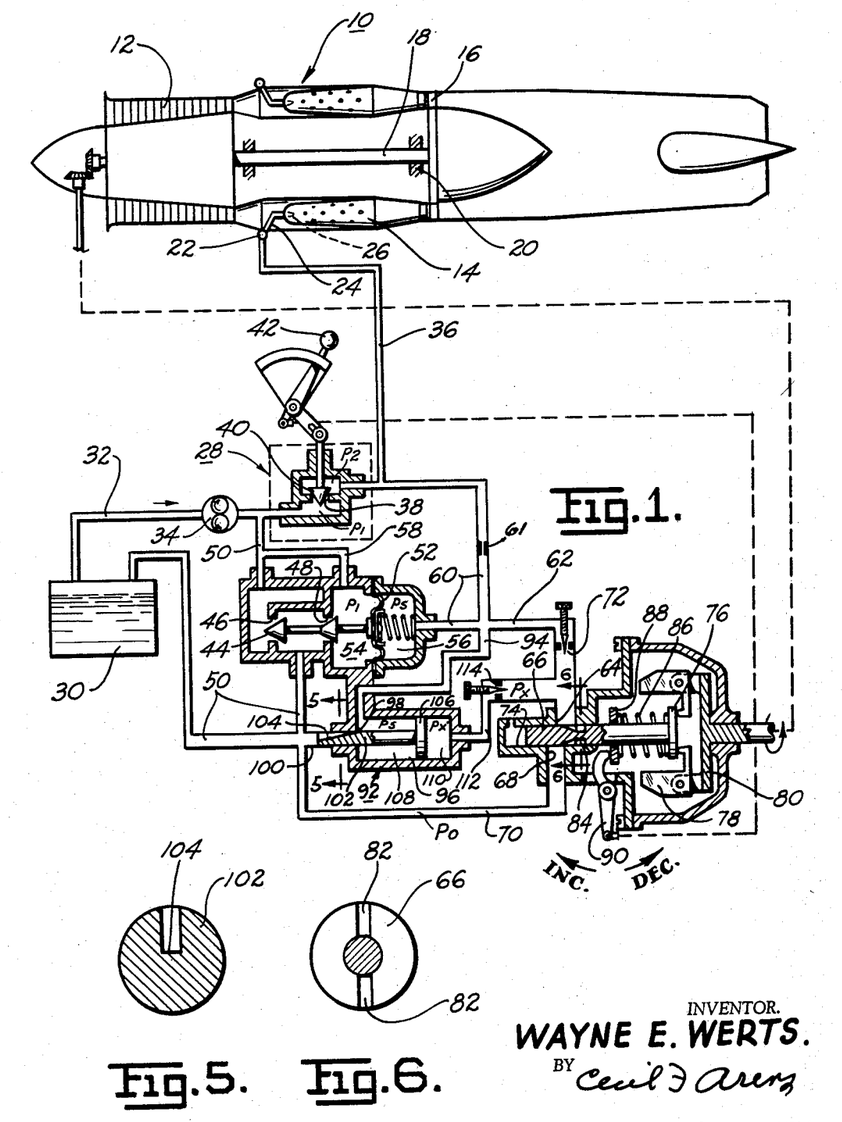
Figure 1 is a sectional view, with the parts thereof shown in elevation, of a gas turbine engine having operatively associated therewith fuel control means embodying the present invention.
Figures 5 and 6 are vertical cross-sections taken along lines 5—5 and 6—6 respectively of Figure 1.

Now referring to Figure 1, numeral 10 represents a gas turbine engine having a compressor 12, combustion chambers 14, a turbine 16 drivably connected to the compressor 12 through a shaft 18 journalled in bearings 20, a fuel manifold 22, fuel lines 24 and fuel nozzles 26. A main fuel control 28 receives fuel from a fuel tank 30 via an inlet conduit 32 and fuel pump 34 and discharges fuel to the fuel manifold 22 via outlet conduit 36. The inlet and outlet conduits 32 and 36 are connected by an orifice 38 the effective flow area of which is controlled by a fuel metering valve 40 connected to, and actuable as a function of the position of, a throttle member 42. The fuel pump 34, as shown, is of the gear type and is driven by the engine through suitable conventional driving means, not shown, such that the discharge rate of the pump is proportional to engine speed.

The fuel pressure differential $P_1-P_2$ across the orifice 38 of fuel metering valve 40 is controlled by a by-pass valve 44 which cooperates with by-pass valve ports 46 and 48 to vary the flow of fuel through conduit 50 connected between inlet conduit 32 and the fuel tank 30. The by-pass valve 44 is actuated by a diaphragm 52 which responds to the pressure differential $P_1-P_s$ between chambers 54 and 56 oppositely disposed thereto. The chamber 54 communicates with passge 50 through passage 58 and chamber 56 communicates with outlet conduit 36 through a passage 60. A damping restriction 61 is secured in passage 60. The chamber 56 is vented to passage 50 at pressure $P_0$ through a governor valve circuit which includes a passage 62 connected between passage 60 and a valve inlet port 64, governor valve 66, valve outlet port 68 and passage 70. The effective flow area of the passage 62 is controlled by a variable area restriction 72. The governor valve 66 is slidably contained in a bore 74 and is provided with a flanged end 76 which is engaged by a pair of governor weights 78 pivotally mounted on a carrier 80 having a driving connection with the compressor 12 through a conventional gearing arrangement, not shown. The governor valve 66 is provided with milled slots 82, see Figure 6, and annulus 84 which are in series flow relationship and which register with valve inlet port 64 and valve outlet port 68 to vary the effective flow area between passages 62 and 70 depending upon the position of the governor valve. The depth of the milled slots 82 varies from a maximum depth at a point adjacent annulus 84 to a minimum depth at the opposite end of the slots. Thus, as the governor valve moves toward the left, the extent to which the valve ports 64 and 68 are opened progressively increases. A spring 86 interposed between flange 76 and a spring retainer 88 slidably engaged with governor valve 66 acts to load the valve depending upon the position of the manually operated throttle lever 42 operably connected to the spring retainer 88 via suitable linkage which includes a lever 90.

The inventive concept disclosed herein lies in the provision of a reset mechanism 92 for varying the by-pass control pressure $P_s$ in accordance with a predetermined relationship between the area of restriction 72 and effective flow area of governor valve 66. Referring to Figure 1, the chamber 56 is communicated with passage 50 via passage 60, a passage 94, a chamber 96, a valve port 98 and a passage 100. A circular valve 102 slidably contained by valve port 98 is provided with a milled slot 104 which varies in cross sectional area axially along said valve. The chamber 96 slidably contains a piston 106 fixedly secured to the end of valve 102. The piston 106 divides chamber 96 into a variable volume chamber 108 in series flow with passage 94 and valve port 98 and a variable volume chamber 110 which communicates with passage 62 downstream from restriction 72 via a passage 112. An adjustable restriction 114 is secured in passage 112. The piston 106 controls the position of valve 102 relative to valve port 98 in response to the pressure differential $P_s-P_x'$ between chambers 108 and 110 and the drain pressure $P_0$ which acts against the end of valve 102. Since the opposed surfaces of piston 106 are unequal in area the piston is essentially a ratio sensing device with a balance condition occurring in accordance with a predetermined ratio relationship between pressure $P_0$ acting on the end of valve 102, pressure $P_s$ acting on the smaller area of piston 106 and pressure $P_x'$ acting on the larger area of piston 106. For the purpose of illustrating a particular arrangement, it may be assumed that piston 106 will begin to move when a ten percent drop in pressure occurs across restriction 72. Therefore, with a pressure $P_s$ of 300 p.s.i. upstream from restriction 72, the reset piston 106 will remain in equilibrium until the governor valve 66 moves to a position whereby pressure $P_x$ and thus pressure $P_x'$ downstream from restriction 72 is controlled to 270 p.s.i. or less.

Figure 2:
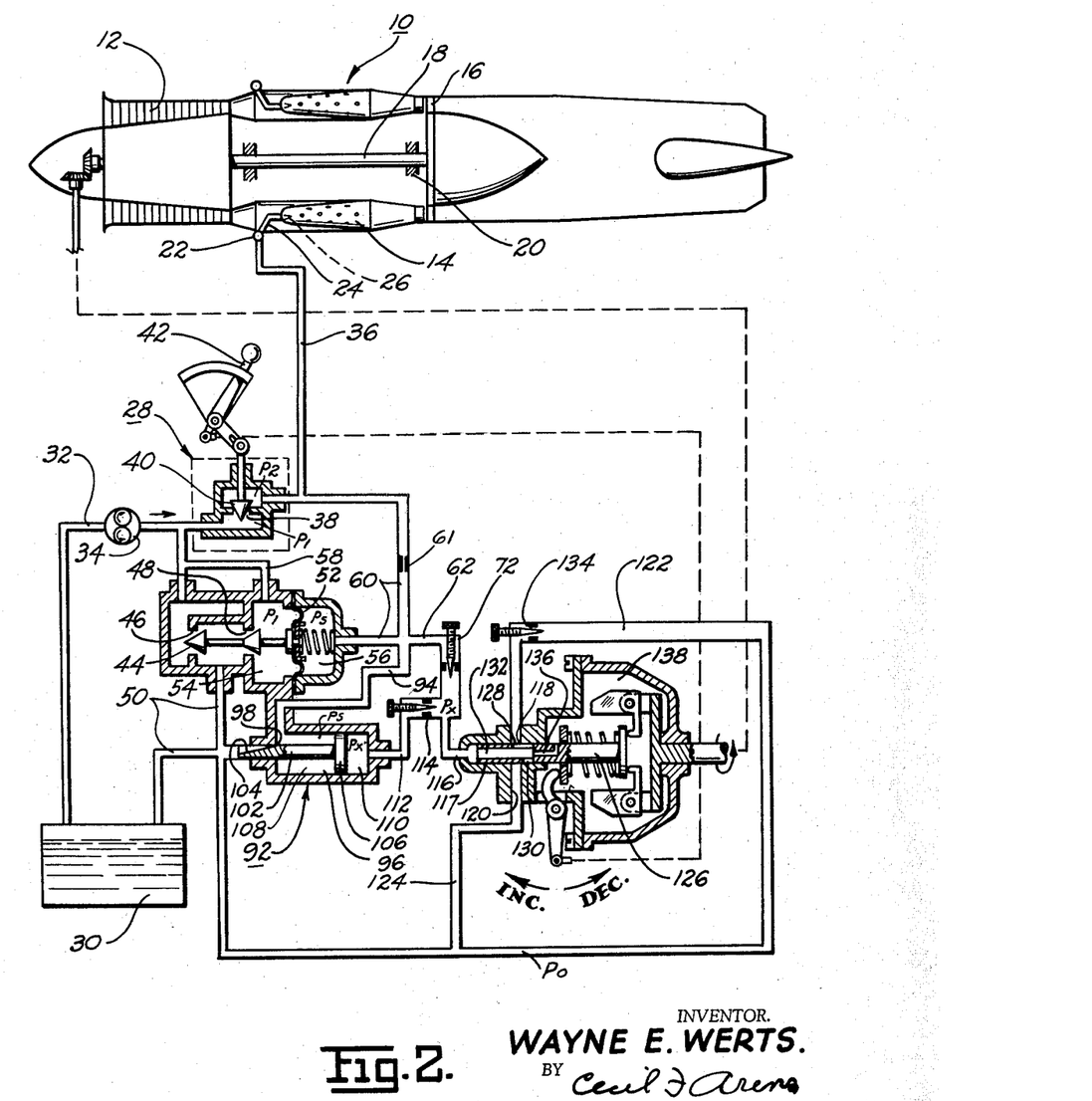
Figure 2 is a sectional view of a modification of the present invention.

Figure 2 illustrates a modification of the structure of Figure 1 wherein like numerals designate similar elements.

The passage 62 is provided with an outlet port 116 which communicates with passage 50 at drain pressure $P_0$ via a bore 117 and valve ports 118 and 120 connected to parallel passages 122 and 124, respectively. A governor valve 126 slidably contained by bore 117 is provided with diametrically opposed ports 128 and 130 which are formed in the walls of sleeved portion 132 of the governor valve. Over a first range of positions of the governor valve 126, the port 128 controls fluid flow from bore 117 through valve port 118 to passage 122 only and over a second range of positions of the governor valve a parallel flow path is introduced by the port 130 which controls fluid flow from bore 117 through valve port 120 to passage 124. An adjustable restriction 134 is secured in passage 122. A passage 136 formed in governor valve 126 communicates the interior of the sleeved portion 132 with a chamber 138 which contains the flanged end of the governor valve 126. Thus, equal fuel pressures are maintained at opposite ends of the governor valve to provide a balanced condition.

Figures 5 and 6 respectively are shown to illustrate a preferred cross sectional shape of the slots which are cut into the reset valve 102 and governor valve 66 but it is apparent that various shapes other than the ones illustrated may be used to achieve the desired result.

*Operation of Figure 1*

Assuming that the engine is initially operating at sea level conditions and an acceleration of the engine from idle to maximum speed is desired, the throttle lever 42 is actuated to a position corresponding to maximum speed. The metering valve 40 is actuated in accordance with the throttle lever position to establish a maximum effective area of restriction 38 and a corresponding maximum flow of fuel to the combustion chamber 14. The governor spring 86 is compressed thus resetting the governor weights 78 which in turn causes the governor valve 66 to disestablish communication between valve ports 64 and 68. The $P_s-P_x$ pressure drop across restriction 72 decreases in response to the closing of governor valve 66 and the by-pass valve 44 moves toward a closed position in accordance with a rise in pressure $P_s$ against diaphragm 52 to maintain the required $P_1-P_2$ differential across metering valve 40. The $P_s-P_x'$ pressure differential across piston 106 decreases to zero and, since the greater effective piston area is exposed to chamber 110, the resulting force acts to drive the piston 106 to the left which in turn actuates valve 102 to a closed position.

Figure 3:
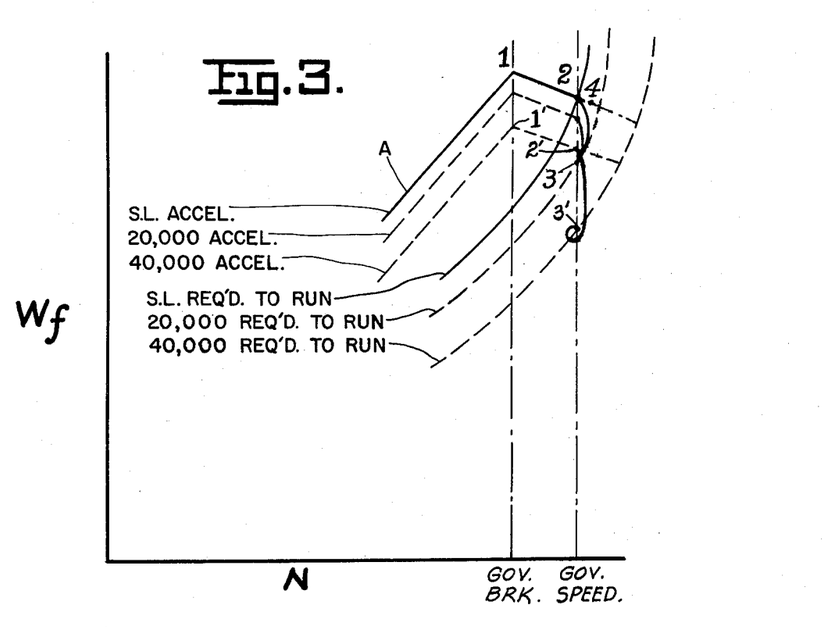
Figures 3 and 4 are curves illustrating a plot of $W_f$ versus N.

Referring to Figure 3 the engine will accelerate along curve A to point 1, at which speed the governor weights 78 develop sufficient force to overcome the spring 86 load to cause an actuation of governor valve 66 toward an open position. As the governor valve slots 82 register with valve ports 64 and 68, passage 62 is vented to passage 70 at drain pressure $P_0$ and pressure $P_x$ decreases. The $P_x'$ pressure in variable volume chamber 110 is vented through passage 112 to pressure $P_x$. When the aforementioned predetermined ten percent pressure drop occurs between pressure $P_s$ and pressures $P_x$ and $P_x'$ the piston 106 and valve 102 will be biased toward the right. The response or rate of movement of piston 106 is controlled by the effective area of the restriction 114 and may be adjusted to suit requirements of the system as desired. The movement of valve 102 toward the right results in a venting of chamber 108 to drain pressure $P_0$ with a corresponding drop in pressure $P_s$ and a movement of the by-pass valve 44 toward an open position to increase the amount of by-pass fuel flow and decrease the $P_1-P_2$ differential across the metering valve 40. In accordance with the decrease in fuel flow through the metering valve the engine continues to accelerate along curve A from point 1 on the acceleration curve to point 2 on the required to run curve, point 2 being the speed at which the governor valve 66 is stabilized by a balance of forces acting thereon. At point 2, the area relationship of governor valve 66 to restriction 72 provides a pressure $P_x$ to which the variable volume chamber 110 pressure $P_x'$ stabilizes. The resulting ratio of pressures $P_0$, $P_s$ and $P_x'$ across the piston 106 and valve 108 acts to hold piston 106 in equilibrium whereupon the engine will operate steady state at the selected speed.

Now, assuming an increase to 20,000 feet in the altitude at which the engine is required to operate with no change in throttle setting, the quantity of fuel supplied to the engine in accordance with sea level conditions will cause an overspeed of the engine at the higher altitude in accordance with a decrease in air density. As the engine speed increases, the governor valve 66 is displaced in proportion to the increase in governor weight 78 force to effect a corresponding increase in flow through valve ports 64 and 68 and a corresponding drop in pressure $P_x$ in passage 62. A subsequent progressive decrease in variable volume chamber 110 pressure $P_x'$ occurs which results in unbalance of the piston 106 and thus valve 102 in such manner as to induce movement toward the right which in turn effects a corresponding increase in flow through valve port 98 and a drop in the by-pass control pressure $P_s$. The by-pass valve 44 opening is increased thus allowing more by-pass fuel flow through ports 46 and 48 thereby causing a reduction in $P_1-P_2$ pressure differential across the metering valve and a subsequent decrease in engine speed. As the engine speed decreases, the governor valve 66 drifts in a closing direction in accordance with the decrease in the force of the governor weights 78 until the valve reaches a position which establishes the pressure $P_x$ required to set up a $P_s-P_x'$ differential which satisfies the force required to balance piston 106. This action is illustrated by the curve A from point 2 on the required to run curve to point 3 on the 20,000 foot required to run curve. The curve A from point 2 to point 3 is exaggerated and in actual operation follows very close to the vertical dashed line from point 2 to point 3. Since changes in altitude conditions occur relatively slow; the reset piston 106 functions to correct fuel flow as engine fuel requirements change in a substantially simultaneous manner. At point 3, the piston 106 is in equilibrium and the engine will continue to operate steady state at the selected speed.

The response of piston 106 to variations from the governed set speed at point 2 may be varied to suit requirements by adjusting the area of restriction 72 or by changing the contour of the governor valve 66 as desired.

If, for example, it is desired to delay the action of the reset piston 106 until point 4 or any other point on the dashed extension of the line from 1 to 2 is reached, the restriction 72 may be adjusted to a larger area. As a result, the restriction 72 will provide less resistance to flow and the aforementioned ten percent $P_s - P_x$ pressure differential required to actuate piston 106 will not be obtained until a higher engine speed is reached, at which time the area of governor valve 66 has increased correspondingly. Obviously, the same effect would result if the area setting of restriction 72 was left unchanged and the governor valve 66 recontoured to provide a smaller effective area at port 68 for a given engine speed.

If the engine speed should decrease from the on-speed condition, the abovementioned sequence of operation will be reversed with the result that the piston 106 will be unbalanced in a direction to reduce the flow through port 98 thus causing an increase in by-pass control pressure $P_s$ and an increase in the $P_1 - P_2$ pressure differential across the metering valve 40. Subsequently upon reaching the on-speed position the governor valve 66 will again establish the $P_s - P_x'$ differential required to balance piston 106.

In the case of an acceleration of the engine from idle speed to the aforementioned maximum speed at any altitude, for example, 40,000 feet the fuel flow will be scheduled by the main fuel control along the appropriate acceleration schedule shown in Figure 3 with the governor break action occurring at a speed corresponding to point 1 on curve A. As in the case of the heretofore described acceleration at sea level, the governor valve 66 is proportional in operation from the governor break point to the 40,000 foot required to run curve i.e., for each incremental increase in engine speed a corresponding proportional increase occurs in the force generated by the governor weights 78 which causes the governor valve 66 to move proportionally in an opening direction.

This proportional action of the governor valve 66 will then govern the engine along the line from point 1' to point 2' which is substantially parallel to the line from points 1 to 2 on curve A until a speed corresponding to point 2 and indicated by point 2' is reached at which time the reset mechanism functions in the above mentioned manner to govern the engine to the selected speed indicated by point 3' on 40,000 foot required to run curve.

The stability of the system may be controlled in accordance with the rate of movement, or reset time, of piston 106 and is easily selected through suitable adjustment of restriction 114. It is apparent that with the restriction 114 fully open the piston 106 and valve 102 will have a rapid integrating action which is unstable in operation and with the restriction 114 fully closed the governor valve 66 action would provide proportional action which is stable in operation. With the metering valve wide open, fuel flow to the engine is proportional to engine speed in accordance the characteristics of pump 34 mentioned heretofore. Therefore, between the two extremes some intermediate adjustment of restriction 114 will provide the desired condition for stability of operation.

*Operation of Figure 2*

Figure 4:
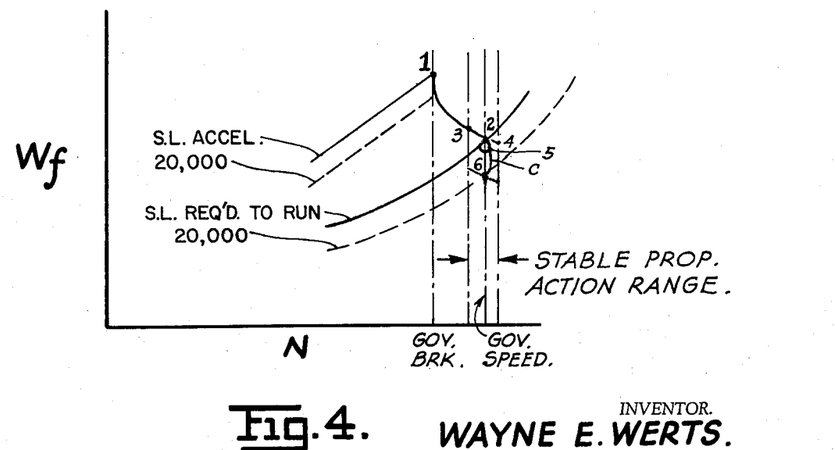

Assuming an acceleration of the engine to maximum speed under sea level conditions as in the case of Figure 1, the same sequence of events will occur up to point 1 on the curve of Figure 4. At point 1 on this curve the governor weight 78 force is sufficient to overcome the governor spring 86 force thus causing governor valve 126 to move in a direction to open valve port 128 whereupon the pressure $P_x$ in passage 62 is caused to drop at a relatively rapid rate in accordance with the square law flow characteristics exhibited by the orifice 134 as will be readily understood by those skilled in the art which in turn effects a corresponding drop in by-pass control pressure $P_s$ and in variable volume chamber 110 pressure $P_x'$. The piston 106 acts in response to the $P_s - P_x'$ differential between chambers 108 and 110 and moves to the right to reposition valve 102 and further reduce pressure $P_s$. As the by-pass valve 44 opens, the $P_1 - P_2$ differential across the metering valve 40 decreases causing a reduction in fuel flow to the engine such that the engine continues to accelerate along the curved line from point 1 to point 2. As the governor valve 126 moves toward the left in response to increasing engine speed and causes a progressive increase in the effective flow area of port 128, the flow through restriction 134 approaches critical flow values whereupon the pressures upstream from the restriction tend to vary only slightly with further increases in the effective area of port 128. As a result, the curved line from points 1 to 2 in Figure 4 tends to flatten out in the region from point 3 to point 2. Upon reaching point 2, the governor valve 126 has approached its equilibrium condition and piston 106 is balanced by the $P_s - P_x'$ differential established thereacross. Through suitable adjustment of the restriction 134, the slope of the curve from 1 to 2 may be varied to provide an optimum fuel flow schedule for stability purposes over this portion of the speed range. For example, adjusting the restriction to provide a relatively large flow area will effect an increase in the slope of the curve from point 1 to point 2 whereas a relatively small area will produce an opposite effect. In this manner, the variation in fuel flow between points 1 and 2 of Figure 4 for a given increment of engine r.p.m. can be adjusted through adjustment of restriction 134 to compensate for the stability characteristics of a given engine. Points 3 and 4 respectively represent engine speeds slightly below and above the selected maximum engine speed represented by point 2. The shallow slope of the line between point 3 and point 4 represents a narrow band of stable operation within which small changes in fuel flow occur in response to small changes in engine speed through essentially the proportional action of the governor valve 126 only, since effective action of the reset is quite small in response to minor changes in engine speed. This narrow band of stable proportional governor action is indicated in Figure 4 by the notation "stable prop. action range." Within the above mentioned range of stable operation, the reset piston 106 will not respond to any appreciable extent to temporary small disturbances in engine speed which may occur in a rapid manner as a result of external influences under steady state operating conditions.

Now, assuming an ascension of the aircraft and the engine to 20,000 feet at the same throttle setting the engine speed will tend to increase as a result of the excessive amount of fuel being supplied in relation to the engine fuel requirements at that altitude for the selected speed. The increase in speed causes the governor weights 78 to actuate the governor valve 126 in an opening direction.

As the engine speed increases from the on-speed point 2, the output force of governor weights 78 increases and moves the governor valve 126 from its neutral position. In accordance with the movement of governor valve 126 the effective flow area of port 118 is increased causing a concomitant decrease in pressure $P_x$. The resulting increase in the $P_s - P_x'$ pressure differential across piston 106 causes movement of valve 102 toward an open position which in turn decreases the pressure $P_s$ in chamber 56 whereupon the by-pass valve 44 is moved toward its open position. The $P_1 - P_2$ pressure differential across metering valve 40 decreases causing a decrease in fuel flow to the engine and a reduction in engine speed such that stabilization of piston 106 occurs at point 6 on the 20,000 ft. required to run curve of Figure 4. As stated previously, the reset action of piston 106 occurs substantially as rapid as the engine fuel requirement changes with variations in altitude which results in control of fuel flow along the curved line from 2 to 6 in close proximity to the vertical line from point 2 to point 6. The point 6 lies at the mid-point of a line having a slope characteristic similar to that of the line between points 3 and 4 and represents a point in the aforementioned narrow band of stable operation within which the reset mechanism 92 remains substantially inoperative in that its effect on minor speed flow disturbances are negligible.

The valve port 130 in governor valve 117 comes into operation when the speed variation from the governed set point occurs at a relatively rapid rate. Assuming a maximum acceleration rate of the engine to the point 2 on the sea level required to run curve of Figure 4, the aforementioned sequence of events will occur up to point 2. Upon reaching point 2, the engine will tend to overshoot the selected speed due to the limited ability of the control fuel pressures to keep pace with the rapid transient speed conditions which exist at that point. The output force of governor weights 78 will increase in accordance with the engine speed and bias the governor valve 126 against the spring 86. As the weight force increases beyond the valve required to balance the force of spring 86, the governor valve 126 is actuated past its neutral point and valve port 130 is moved into communication with port 120. The pressure $P_x$ is vented through valve port 120 which in addition to the flow through valve port 118 results in a rapid drop in pressure $P_x$ which in turn causes a drop in pressure $P_s$ such that the by-pass valve 44 moves towards an open position thus decreasing the $P_1-P_2$ pressure differential across the metering valve. The sudden reduction in fuel flow to the engine governs the engine along the line C of Figure 4 from point 2 to point 5. At point 5 the piston 106 has moved sufficiently to readjust the speed of the engine to the selected speed at point 2 on the sea level required to run curve. The piston 106 response occurs as the drop in pressure $P_x'$ which occurs subsequent to a drop in pressure $P_x$ causes an increase in the $P_s-P_x'$ pressure differential across the piston 106. The piston 106 and valve 102 are displaced toward the right thus increasing the flow of fuel at pressure $P_s$ through valve port 98 which results in movement of the by-pass valve 44 towards the closed position. The rate of movement is damped by the action of restriction 114 to prevent the sudden dumping of pressure $P_s$ through valve port 98 which action would tend to introduce instability in the fuel by-pass system. The engine operation is controlled along the curved line C to point 2 whereupon the governor valve 126 is balanced and valve port 130 closed. At point 2, the piston 106 is balanced by the required $P_s-P_x'$ pressure differential. Thus, it is seen that excessive speed overshoot of a selected speed is prevented by the action of the valve port 130 which also serves to hold the speed to a predetermined limit until the reset mechanism 92 action is effected. The slope of line C from point 2 to point 5 may be adjusted to give any desired overshoot protection by suitable contouring of governor valve port 130.

Figure 7:
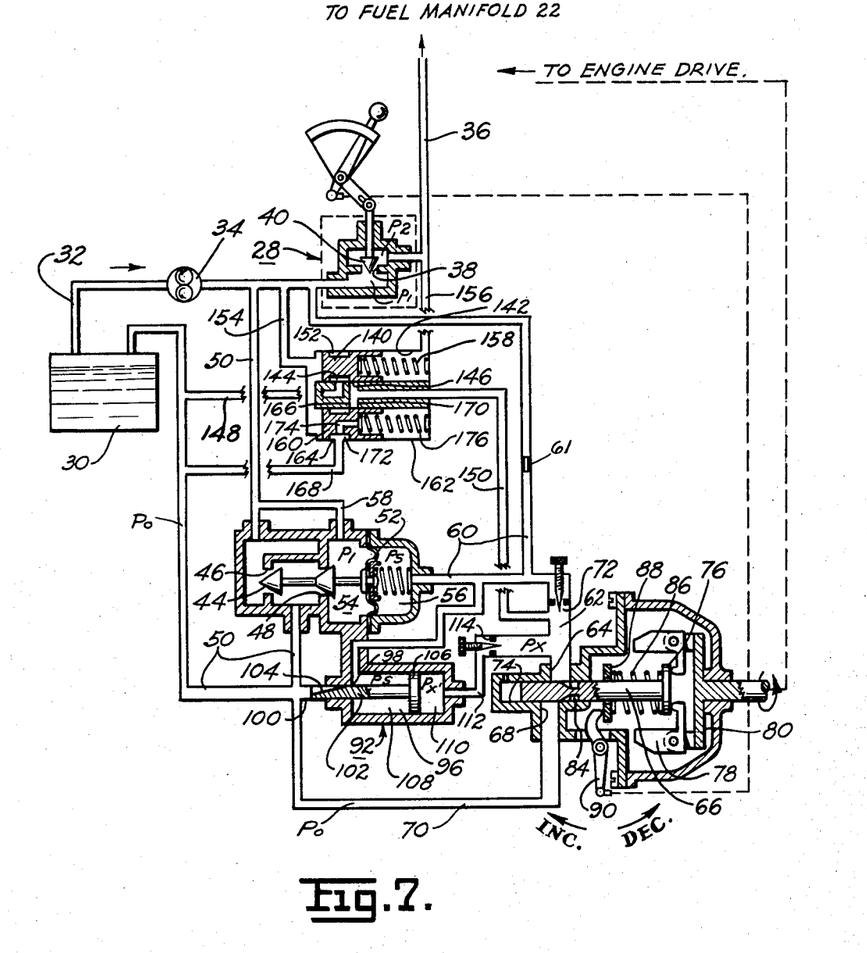
Figure 7 is a sectional view, with the parts thereof shown in elevation, of another fuel control means embodying the present invention.
Figure 8:
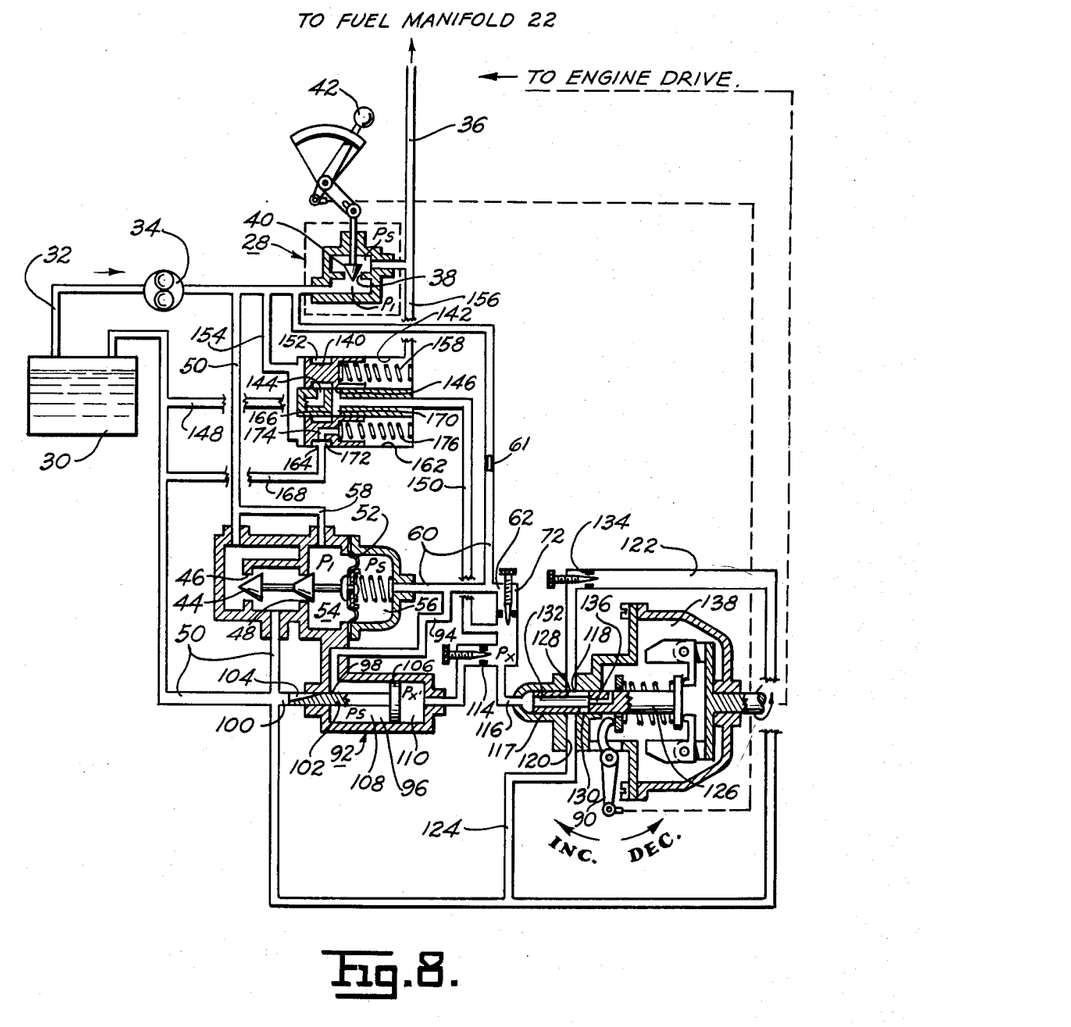
Figure 8 is a sectional view of the fuel control means of Figure 7 embodying the governing valve of Figure 2.

Referring to Figures 7 and 8 wherein parts similar to those of Figures 1 and 2 are designated by like numerals, numeral 140 designates a by-pass valve slidably carried in a bore 142 having ports 144 and 146 which communicate with passage 50 at pressure $P_0$ and passage 62 at pressure $P_x$ downstream of restriction 72 respectively via passages 148 and 150. Port 144 communicates with port 146 via an annulus 152 formed in by-pass valve 140. The valve 140 has opposite sides which communicate with inlet passage 32 and outlet passage 36 via one end of bore 142 and a passage 154 and the opposite end of bore 142 and passage 156 respectively and functions to control the $P_1-P_2$ pressure drop across the valve 40 to to a predetermined value depending upon the force of a spring 158 which bears against valve 140. In addition to controlling communication between ports 144 and 146, the valve 140 is arranged to control communication between port 144 and bore 142 at inlet fuel pressure $P_1$.

The inlet fuel pressure $P_1$ is limited to a predetermined maximum value by a valve 160 slidably carried in a bore 162 having ports 164 and 166 which communicate with passage 50 at pressure $P_0$ and passage 62 at pressure $P_x$ downstream of restriction 72 via passage 168 and passages 170 and 150 respectively. Fuel at inlet pressure $P_1$ is communicated to one side of valve 160 via passage 154 and bore 162 and fuel at pressure $P_0$ is communicated to the opposite side of valve 160 via an annulus 172 and passage 174 formed in valve 160. The predetermined value to which the pressure $P_1$ is limited is determined by the force exerted by a spring 176 which bears against valve 160.

In the arrangement shown in Figures 7 and 8 the passage 60 communicates with inlet fuel passage 32 at pressure $P_1$ instead of outlet fuel passage 36 at pressure $P_2$ as shown in Figures 1 and 2.

Operation of Figures 7 and 8

As shown in Figures 7 and 8 the ports 146 and 164 are in parallel flow relationship with the governor valve 66 and 126, respectively. If existing conditions of operation are such that the inlet pressure $P_1$ is below the predetermined maximum value and the $P_1-P_2$ pressure drop across valve 40 is at the predetermined constant value the valves 140 and 160 are biased to a closed position and the operation of the fuel control is substantially identical to that of Figures 1 and 2. Now, assuming that the $P_1-P_2$ pressure drop across valve 40 is in excess of the predetermined constant value, the valve 140 is unbalanced causing spring 158 to be compressed and communication between port 146 and port 144 is established. The flow area downstream of restriction 72 is increased by an amount equal to the effective area of port 146 which when added to the effective area of governor valve 66 or 126 results in a variation from the aforementioned predetermined area relationship upon which the balance condition of piston 106 depends. The subsequent drop in pressure $P_x$ in passage 62 results in an increase in the $P_s-P_x'$ drop across piston 106, which displaces the valve 102 toward chamber 110 thereby venting chamber 108 to pump inlet pressure $P_0$. The pressure $P_s$ in chamber 56 decreases resulting in actuation of valve 44 toward an open position such that the by-pass flow through restrictions 46 and 48 is increased to reduce the inlet pressure $P_1$, whereupon the $P_1-P_2$ pressure drop across valve 40 is controlled to the required value. Upon reaching the predetermined $P_1-P_2$ pressure drop, the valve 140 returns to a balanced position and communication between ports 144 and 146 is disestablished. The flow area downstream of restriction 72 is then determined by governor valve 66 or 126 only and the aforementioned predetermined area relationship is re-established which results in the $P_s-P_x'$ pressure differential required to balance piston 106.

The valve 160 operates in a manner similar to that of valve 140 with an increase in pressure $P_1$ above the predetermined maximum value resulting in actuation of valve 160 against the spring 176 to thereby establish communication between ports 164 and 166. The resulting increase in flow area downstream of restriction 72 produces a drop in pressure $P_x$ such that the $P_s-P_x'$ pressure differential across piston 106 varies forcing piston 106 toward chamber 110 thereby venting chamber 108 to pump inlet pressure $P_0$. The by-pass valve 46 moves toward an open position in accordance with the increase in $P_1-P_s$ pressure differential acting against diaphragm 52 to increase the amount of by-pass flow through restrictions 46 and 48 which results in a corresponding decrease in pressure $P_1$. Subsequent to a drop in pressure $P_1$ below the maximum allowable value the valve 160 moves to a closed position and piston 106 attains a balanced condition.

It is apparent that depending upon conditions of operation, the reset piston may be unbalanced by the response of valve 140, valve 160 or governor valve 66 or by any combination of response of the three.

Although only a limited number of embodiments are shown and described herein, it will be apparent to those skilled in the art that various changes may be made to suit requirements of a particular application without departing from the scope of the invention.

I claim:

1. In control apparatus for controlling the speed of a combustion engine, the combination of control means for controlling the operation of said engine, a fluid pressure responsive member connected to actuate said control means, a fluid chamber communicating with said fluid pressure responsive member, a first passage connecting said chamber with a source of pressurized fluid, second and third passages in parallel flow rerationship connecting said chamber with a source of fluid at a lower pressure than said first named source, variable area valve means in said second passage for controlling the fluid flow therethrough, a restriction in said second passage upstream from said valve means, a valve member in said third passage for controlling fluid flow therethrough, resilient means operatively connected to said valve means for biasing said valve means with a force corresponding to a selected engine speed, means responsive to the speed of the engine operatively connected to said valve means for varying the effective flow area thereof as a function of engine speed, said speed responsive means producing a force in response to said selected engine speed which balances the force of said resilient means to thereby establish said valve means in a null position whereupon a predetermined ratio of pressures is established between said chamber, said second passage intermediate said restriction and said valve means and said low pressure source, and means responsive to the ratio of said pressures operatively connected to said valve member for actuating the same, said last named means having a position of rest in response to said predetermined ratio of pressures and moving from said position of rest in response to a variation in one or more of said pressures caused by movement of said valve means in one direction or the other from said null position depending upon a relative speed error, said valve member moving with said last named means to adjust the fluid pressure in said chamber and thus said control means as required to bring the engine speed to said selected value whereupon said valve means is repositioned in said null position and said predetermined ratio of pressure is re-established.

2. In control apparatus for controlling the speed of a combustion engine, the combination of control means for controlling the operation of said engine, a fluid pressure responsive member connected to actuate said control means, a fluid chamber communicating with said pressure responsive member, a first passage connecting said chamber with a source of pressurized fluid, a second passage connecting said chamber with a source of fluid at a lower pressure than said first named source, a restriction in said second passage for controlling fluid flow therethrough, variable area valve means in said second passage downstream from said restriction for controlling fluid flow through said second passage, means operatively connected to said valve means for loading said valve means with a force corresponding to a selected engine speed, means responsive to engine speed operatively connected to said variable area valve means for loading said valve means in opposition to said last named means with a force which varies as a function of engine speed, said variable area valve means having a balanced position in response to equalization of said forces acting thereon whereupon a predetermined area relationship exists between the effective flow area of said valve means and said restriction, said predetermined area relationship establishing a corresponding predetermined ratio of pressures between said chamber, said passage intermediate said restriction and said valve means and said low pressure source, and reset means operatively connected to said valve means for controlling the pressure in said fluid chamber in accordance with an off-speed position of said valve means including a third passage connected in parallel flow relationship with said second passage, a valve member in said third passage for controlling fluid flow therethrough, pressure responsive means, operatively connected to said valve member for actuating the same, said pressure responsive means being provided with first, second and third faces which have a predetermined fixed area ratio, said first face having a fluid connection with said low pressure source, said second face having a fluid connection with said fluid chamber, said third face having a fluid connection with said second passage intermediate said restriction and said variable area valve means, said pressure responsive means having a position of rest in response to said predetermined ratio of pressures and moving from said position of rest in response to a variation in one or more of said pressures caused by movement of said variable area valve means from said balanced position in one direction or the other depending upon a relative speed error whereupon said valve member is actuated accordingly to adjust the fluid pressure in said chamber and thus the speed of the engine to re-establish said valve means in said balanced position whereby said predetermined ratio of pressure is re-established.

3. In control apparatus for controlling the speed of a combustion engine, the combination of control means for controlling the operation of said engine, a fluid pressure responsive member connected to actuate said control means, a fluid chamber communicating with said pressure responsive member, a first passage connecting said chamber with a source of pressurized fluid, a second passage connecting said chamber with a source of fluid at a lower pressure than said first named source, a restriction in said second passage for controlling fluid flow therethrough, variable area valve means in said second passage downstream from said restriction for controlling fluid flow through said second passage, means operatively connected to said valve means for loading said valve means with a force corresponding to a selected engine speed, means responsive to engine speed operatively connected to said variable area valve means for loading said valve means in opposition to said last named means with a force which varies as a function of engine speed, said variable area valve means having a balanced position in response to equalization of said forces acting thereon whereupon a predetermined area relationship exists between the effective flow area of said valve means and said restriction, said predetermined area relationship establishing a corresponding predetermined ratio of pressures between said chamber, said passage intermediate said restriction and said valve means and said low pressure source, and reset means operatively connected to said valve means for controlling the pressure in said fluid chamber in accordance with an off-speed position of said valve means including a third passage connected in parallel flow relationship with said second passage, a valve member in said third passage for controlling fluid flow therethrough, pressure responsive means operatively connected to said valve member for actuating the same, said pressure responsive means being provided with first, second and third faces which have a predetermined fixed area ratio, said first face having a fluid connection with said low pressure source, said second face having a fluid connection with said fluid chamber, said third face having a fluid connection with said second passage intermediate said restriction and said variable area valve means, a restriction in said fluid connection between said third face and said passage for damping the movement of said pressure responsive means, said pressure responsive means having a position of rest in response to said predetermined ratio of pressures and moving from said position of rest in response to a variation in one or more of said pressures caused by movement of said variable area valve means from said balanced position in one direction or the other depending upon a relative speed error whereupon said valve member is actuated accordingly to adjust the fluid pressure in said chamber and thus the speed of the engine to re-establish said valve means in said balanced position whereby said predetermined ratio of pressure is re-established.

4. In control apparatus as claimed in claim 3 wherein said last named restriction is adjustable in area thereby providing for varying degrees of damping action in accordance with the characteristics of the system.

5. In control apparatus for controlling the speed of a combustion engine, the combination of control means for controlling the operation of said engine, a fluid chamber, a first passage connecting said chamber with a source of pressurized fluid, second and third passages connecting said chamber with a source of fluid at a lower pressure than said first named source, a pressure responsive member communicating with said fluid chamber and responsive to a control fluid pressure developed therein, a first restriction in said second passage, a second restriction in said second passage downstream from said first restriction for controlling fluid flow therethrough, means responsive to the speed of the engine operatively connected to said second restriction for varying the effective flow area thereof as a function of engine speed, said first and second restrictions having a predetermined area relationship in response to a predetermined position of said last named means corresponding to a selected engine speed whereupon a predetermined pressure ratio is developed across said first and second restriction, pressure responsive valve means in said third passage for controlling fluid flow therethrough, said pressure responsive valve means having three faces of different areas responsive to the fluid pressures in said chamber, said low pressure source and said passage intermediate said first and second restrictions, respectively, and having a balanced position in response to said predetermined ratio of pressures, said pressure responsive valve means being actuated from said balanced position to cause an increase or decrease in said control fluid pressure depending upon a relative error in said predetermined ratio of pressures created by an off-speed position of said speed responsive means whereupon the speed of the engine is regulated to said selected speed.

6. In control apparatus as claimed in claim 5 wherein said pressure responsive valve means includes a valve port in series flow relationship with said third passage and a valve member movable relative to said valve port for varying the effective flow area of the port, said valve member having a slotted portion which varies in cross-sectional area in an axial direction along said valve member.

7. In control apparatus for controlling the speed of a combustion engine, the combination of control means for controlling the operation of said engine, a fluid pressure responsive member connected to actuate said control means, a fluid chamber communicating with said pressure responsive member, a first passage connecting said chamber with a source of pressurized fluid, second and third passages in parallel flow relationship connecting said chamber with a source of fluid at a pressure lower than said first named source, a branch passage connected between said second passage and said low pressure source, a restriction in said second passage upstream from said branch passage, double ported variable area valve means operatively connected to said second passage and said branch passage for controlling fluid flow therethrough, one of said ports being in flow controlling relationship with said second passage and the other of said ports being in flow controlling relationship with said branch passage, a variable area restriction in said branch passage downstream from said valve means, resilient means operatively connected to said variable area valve means for biasing the same with a force corresponding to a selected engine speed, means responsive to engine speed operatively connected to said variable area valve means for biasing the same with a force which varies as a function of engine speed in opposition to said resilient means, said variable area valve means having a balanced condition in response to equal and opposite forces acting thereagainst which condition establishes a predetermined effective flow area of said one of said ports whereby a corresponding predetermined pressure ratio is established across said restriction and said one port, and means including pressure responsive valve means operatively connected to said third passage for controlling fluid flow therethrough, said pressure responsive valve means being responsive to the pressure ratio existing across said restriction and said one port and having a position of rest corresponding to said predetermined pressure ratio, said variable area valve means being actuated from said balanced condition in response to an increase in engine speed to produce opening movement of the other of said ports whereupon the fluid flow diverted therethrough creates an instantaneous relatively rapid decrease in the fluid pressure upstream from said variable area valve means and a corresponding variation in said pressure ratio, said pressure responsive valve means moving toward an open position in response to said pressure ratio variation to cause a decrease in the pressure in said chamber and subsequent actuation of said control means such that the engine speed is regulated to said selected value whereupon the balanced condition of said variable area valve means and said predetermined pressure ratio is re-established.

References Cited in the file of this patent

UNITED STATES PATENTS

| | | |
|---|---|---|
| 2,633,830 | McCourty et al. | Apr. 7, 1953 |
| 2,668,416 | Lee | Feb. 9, 1954 |
| 2,762,426 | Wood et al. | Sept. 11, 1956 |
| 2,765,800 | Drake | Oct. 9, 1956 |
| 2,874,764 | Booth et al. | Feb. 24, 1959 |
| 2,896,652 | Goetsch et al. | July 28, 1959 |

UNITED STATES PATENT OFFICE

CERTIFICATION OF CORRECTION

Patent No. 2,986,126 — May 30, 1961

Wayne E. Werts

It is hereby certified that error appears in the above numbered patent requiring correction and that the said Letters Patent should read as corrected below.

In the grant, line 2, for "The Bnedix Corporation" read -- The Bendix Corporation --; column 2, line 38, for "passge" read -- passage --; column 8, line 1, strike out "to", second occurrence; column 9, line 23, for "rerationship" read -- relationship --.

Signed and sealed this 17th day of April 1962.

(SEAL)
Attest:

ESTON G. JOHNSON
Attesting Officer

DAVID L. LADD
Commissioner of Patents